(12) United States Patent
Alapati et al.

(10) Patent No.: US 8,145,819 B2
(45) Date of Patent: Mar. 27, 2012

(54) METHOD AND SYSTEM FOR STEALING INTERRUPT VECTORS

(75) Inventors: Sangram Alapati, Austin, TX (US);
Brad Lee Herold, Austin, TX (US);
Shakti Kapoor, Austin, TX (US);
Alexandru Adrian Patrascu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1331 days.

(21) Appl. No.: 11/757,418

(22) Filed: Jun. 4, 2007

(65) Prior Publication Data

US 2008/0301402 A1 Dec. 4, 2008

(51) Int. Cl.
*G06F 13/24* (2006.01)
*G06F 13/32* (2006.01)

(52) U.S. Cl. ...................................................... 710/266

(58) Field of Classification Search .................. 710/266
See application file for complete search history.

(56) References Cited

U.S. PATENT DOCUMENTS

| | | | |
|---|---|---|---|
| 5,394,544 A | 2/1995 | Motoyama et al. | |
| 6,151,688 A * | 11/2000 | Wipfel et al. | 714/48 |
| 6,502,152 B1 | 12/2002 | Laurenti | |
| 6,889,167 B2 * | 5/2005 | Curry, III | 702/183 |
| 7,376,820 B2 * | 5/2008 | Kimura et al. | 712/244 |
| 2002/0073398 A1 * | 6/2002 | Tinker | 717/110 |
| 2006/0101181 A1 * | 5/2006 | Post et al. | 710/266 |
| 2006/0271825 A1 * | 11/2006 | Keaffaber et al. | 714/38 |
| 2008/0098146 A1 * | 4/2008 | Lee | 710/269 |

* cited by examiner

*Primary Examiner* — S. Sough
*Assistant Examiner* — Timothy A Mudrick
(74) *Attorney, Agent, or Firm* — Yee & Associates, P.C.; Matthew B. Talpis

(57) ABSTRACT

A system for stealing interrupt vectors from an operating system. Custom interrupt handler extensions are copied into an allocated block of memory from a kernel module. Also, operating system interrupt handlers are copied into a reserved space in the allocated block of memory from an interrupt vector memory location. In response to copying the operating system interrupt handlers into the reserved space in the allocated block of memory, custom interrupt handlers from the kernel module are copied over the operating system interrupt handlers in the interrupt vector memory location. The custom interrupt handlers after being copied into the interrupt vector memory location handle all interrupts received by the operating system.

16 Claims, 7 Drawing Sheets

METHOD AND SYSTEM FOR STEALING INTERRUPT VECTORS

BACKGROUND OF THE INVENTION

1. Field of the Invention

The present invention relates generally to an improved data processing system. More specifically, the present invention is directed to a computer implemented method, system, and computer usable program code for stealing interrupt vectors from an OS to gain access to all system resources.

2. Description of the Related Art

Today, computer systems have evolved into extremely sophisticated devices that may be found in many different settings. Typically, computer systems include a combination of hardware (e.g., semiconductors, circuit boards, etc.) and software (e.g., computer programs). The combination of hardware and software on a particular computer system defines the computing environment. Thus, different hardware platforms and different operating systems (OSs) provide different computing environments.

As advances in semiconductor processing and computer architecture push the performance of the computer hardware higher, more sophisticated computer software programs have evolved to diagnostically test these hardware components. However, most OSs do not allow test programs to run in a privileged or a partition manager mode. In addition, most OSs do not allow test programs access to real memory. Consequently, in order for a user program to test all possible computer states and resources, the test program must have the ability to get around these OS limitations.

Current solutions to these OS limitation problems include test programs that simply do not run on an OS or test programs that only use as many system resources as the OS will give the test programs to test. Test programs that do not run on an OS are written in assembly language and are loaded directly into memory or a cache. In addition, these types of test programs run independently of any OS and do not have access to standard OS services, such as virtual memory management and scheduling, which may be a disadvantage.

In contrast, test programs that run on top of an OS may only request memory and resources from the OS. By only being able to request memory and resources from the OS, much of a computer's functionality is out of the reach of these types of test programs. As a result, these types of test programs must rely on indirectly influencing the OS to execute some code in a privileged or a partition manager mode in order to test those out-of-reach areas.

Another related solution is to have a custom OS, which has built-in test functionality, to allow test programs access to the whole computer. The downside of utilizing this type of test program is the necessity of maintaining a completely separate OS. As a result, an additional solution is needed to allow test programs to run on an existing OS and yet still allow access to all of a computer's resources.

Therefore, it would be beneficial to have an improved computer implemented method, system, and computer usable program code for stealing interrupt vectors from an OS to allow a test program access to all system resources.

SUMMARY OF THE INVENTION

Illustrative embodiments provide a computer implemented method, system, and computer usable program code for stealing interrupt vectors from an operating system. Custom interrupt handler extensions are copied into an allocated block of memory from a kernel module. Also, operating system interrupt handlers are copied into a reserved space in the allocated block of memory from an interrupt vector memory location. In response to copying the operating system interrupt handlers into the reserved space in the allocated block of memory, custom interrupt handlers from the kernel module are copied over the operating system interrupt handlers in the interrupt vector memory location. The custom interrupt handlers after being copied into the interrupt vector memory location handle all interrupts received by the operating system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
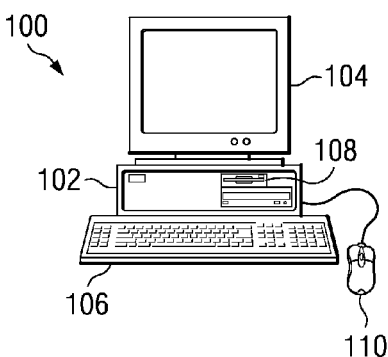
FIG. 1 is a pictorial representation of a data processing system in which illustrative embodiments may be implemented.
Figure 2:
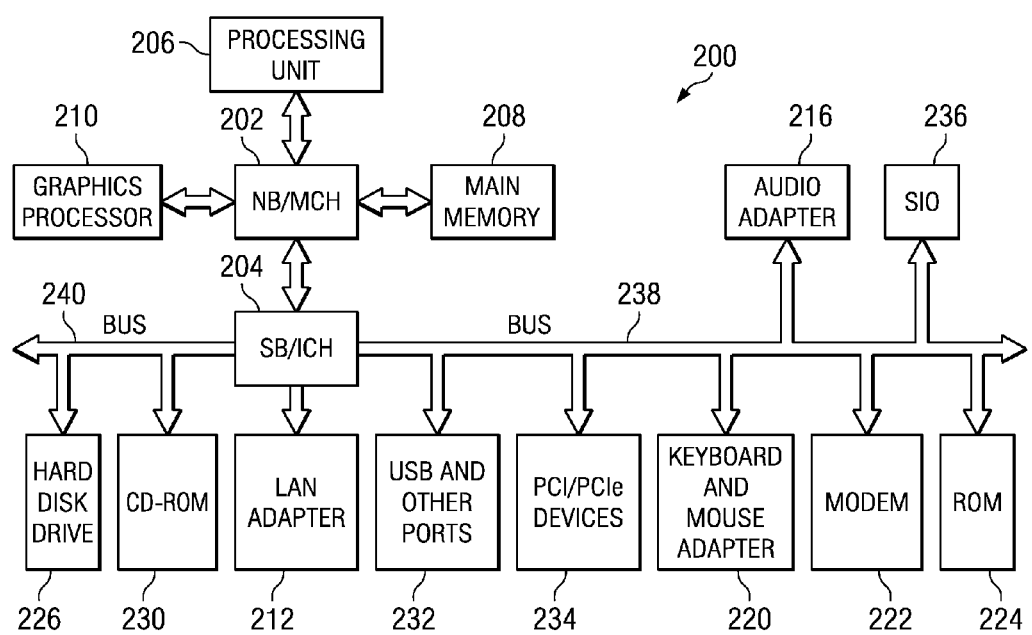
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a data processing system in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices may include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to NB/MCH 202. Processing unit 206 may contain one or more processors and even may be implemented using one or more heterogeneous processor systems. Graphics processor 210 may be coupled to NB/MCH 202 through an accelerated graphics port (AGP), for example.

In the depicted example, local area network (LAN) adapter 212 is coupled to SB/ICH 204, audio adapter 216, keyboard and mouse adapter 220, modem 222, read only memory (ROM) 224, universal serial bus (USB) and other ports 232. PCI/PCIe devices 234 are also coupled to SB/ICH 204 through bus 238. Hard disk drive (HDD) 226 and CD-ROM 230 are coupled to SB/ICH 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to SB/ICH 204.

An OS runs on processing unit 206. This OS coordinates and controls various components within data processing system 200 in FIG. 2. The OS may be a commercially available OS, such as Microsoft® Windows XP®. Microsoft® and Windows XP® are trademarks of Microsoft Corporation in the United States, other countries, or both. Alternatively, the OS may, for example, be an advanced interactive executive (AIX®) OS, which is a product available from the IBM® Corporation. An object oriented programming system, such as the Java™ programming system, may run in conjunction with the OS and provides calls to the OS from Java™ programs or applications executing on data processing system 200. Java™ and all Java™-based trademarks are trademarks of Sun Microsystems, Inc. in the United States, other countries, or both.

Instructions for the OS, the object-oriented programming system, and applications or programs are located on storage devices, such as HDD 226. These instructions and may be loaded into main memory 208 for execution by processing unit 206. The processes of the illustrative embodiments may be performed by processing unit 206 using computer implemented instructions, which may be located in a memory. An example of a memory is main memory 208, ROM 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 may be varied from the illustrative examples shown. In some illustrative examples, data processing system 200 may be a personal digital assistant (PDA). A personal digital assistant generally is configured with flash memory to provide a non-volatile memory for storing OS files and/or user-generated data. Additionally, data processing system 200 may be a tablet computer, laptop computer, or telephone device.

Other components shown in FIG. 2 may be varied from the illustrative examples shown. For example, a bus system may be comprised of one or more buses, such as a system bus, an I/O bus, and a PCI bus. Of course, the bus system may be implemented using any suitable type of communications fabric or architecture that provides for a transfer of data between different components or devices attached to the fabric or architecture. Additionally, a communications unit may include one or more devices used to transmit and receive data, such as modem 222 or LAN network adapter 212. Further, a memory may be, for example, main memory 208 or a cache such as found in NB/MCH 202. Also, a processing unit may include one or more processors or CPUs. Moreover, illustrative embodiments may be implemented in a logically partitioned data processing system.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Illustrative embodiments provide a computer implemented method, system, and computer usable program code for stealing interrupt vectors from an operating system, such as, for example, an advanced interactive executive operating system. In response to a superuser, such as a system administrator with root access to a data processing system, installing a kernel module on an operating system in the data processing system, the kernel module allocates a contiguous block of real memory in the data processing system and copies custom interrupt handler extensions from the kernel module into the allocated block of memory. In addition, the kernel module copies operating system interrupt handlers into a reserved space in the allocated block of memory from an architected interrupt vector memory location. The reserved space is located directly after each of the custom interrupt handler extension vector locations in the allocated block of memory. In response to copying the operating system interrupt handlers into the reserved space in the allocated block of memory, the kernel module copies custom interrupt handlers from the kernel module over the operating system interrupt handlers in the architected interrupt vector memory location. The custom interrupt handlers after being copied into the interrupt vector memory location handle all interrupts received by the operating system.

Then, in response to the operating system receiving an interrupt, one of the custom interrupt handlers associated with the interrupt begins processing the interrupt. The custom interrupt handler associated with the interrupt saves basic register states and branches to one of the custom interrupt handler extensions. The custom interrupt handler extension corresponds with the custom interrupt handler. Afterward, the custom interrupt handler extension determines whether special processing is required by the custom interrupt handler extension. In response to determining that special processing is required by the custom interrupt handler extension, the custom interrupt handler extension continues to custom interrupt code for executing, for example, a test program that tests all of the data processing system's resources. Subsequently, the custom interrupt handler extension returns from the interrupt.

An interrupt is a signal that indicates the need for a change in execution of a processing unit. A normal response to an interrupt signal is to begin execution of an interrupt handler at the interrupt vector. The interrupt handler saves the execution state of the processing unit and initiates a context switch. The interrupt vector is a memory address of the interrupt handler or an index into an interrupt vector table. The interrupt vector table contains memory addresses of interrupt handlers. The interrupt vector table associates the interrupt handler with an interrupt request. When a processing unit is interrupted by an interrupt, the processing unit looks up the interrupt handler in the interrupt vector table and transfers control to the interrupt handler.

Illustrative embodiments allow a test program to run on top of an OS while allowing the test program access to any and/or all system hardware resources, such as real memory, caches, and registers, for testing. However, it should be noted that alternative illustrative embodiments may only allow a test program access to specified portions of the system's hardware resources. Illustrative embodiments provide the test program total access to a system's resources by stealing control of interrupt vectors from the OS and replacing the stolen OS interrupt handlers with custom interrupt handlers that allow the test program full access to the system. When the test program does not require custom interrupt processing, the custom interrupt handler extensions simply pass control on to the OS interrupt handlers as if the custom interrupt handlers and custom interrupt handler extensions were not present. In other words, the OS is not aware of the presence of the custom interrupt handlers and custom interrupt handler extensions. By incorporating certain hooks in the custom interrupt handler extensions, the test program may enter any machine state and have access to all the machine's resources without the OS's knowledge. As a result, a user may use illustrative embodiments to, for example, periodically track specific interrupts or periodically monitor processor special purpose register values of a privileged or a partition manager mode.

Illustrative embodiments consist of a software program that is in the form of a kernel module, or kernel extension, which a superuser installs on the OS, custom interrupt handlers that replace the OS interrupt handlers, and real extension code that is called from the custom interrupt vectors. It should be noted that the program developer must write the kernel module in such a way that the kernel module has knowledge of the system's hardware architecture and the OS that the kernel module will be run on.

After the OS receives an interrupt, the custom interrupt handler only saves a few essential registers and then branches to the custom interrupt handler extension for that specific interrupt. The custom interrupt handler extension determines if the interrupt is taking place inside a test, is being called to start a test, or is being handled by the OS. If the interrupt is taking place inside a test or is called to start a test, then the interrupt handler branches to code for handling these types of test situations. If the interrupt is handled by the OS, then the processor registers that were previously used are restored and the execution path continues on as normal by falling into a copy of the original OS interrupt handler.

Thus, illustrative embodiments allow the OS interrupt handlers to continue handling interrupts as normal when the test program is not executing a test on the system's resources. In addition, illustrative embodiments let the test program run on top of the OS without the restrictions or knowledge of the OS, while maintaining access to all system resources. Illustrative embodiments have an advantage over the no-OS test program method because the test program does not need to worry about anything but writing test code and executing the tests, as the OS takes care of the test program's memory needs and scheduling. Also, illustrative embodiments may allow multiple test programs to run at the same time under the OS, which may provide more versatility in system testing. Furthermore, illustrative embodiments have an advantage over the specialized test OS method because illustrative embodiments do not require maintenance of another entire OS. Moreover, illustrative embodiments may take advantage of all of the functionality of the existing OS.

Figure 3:
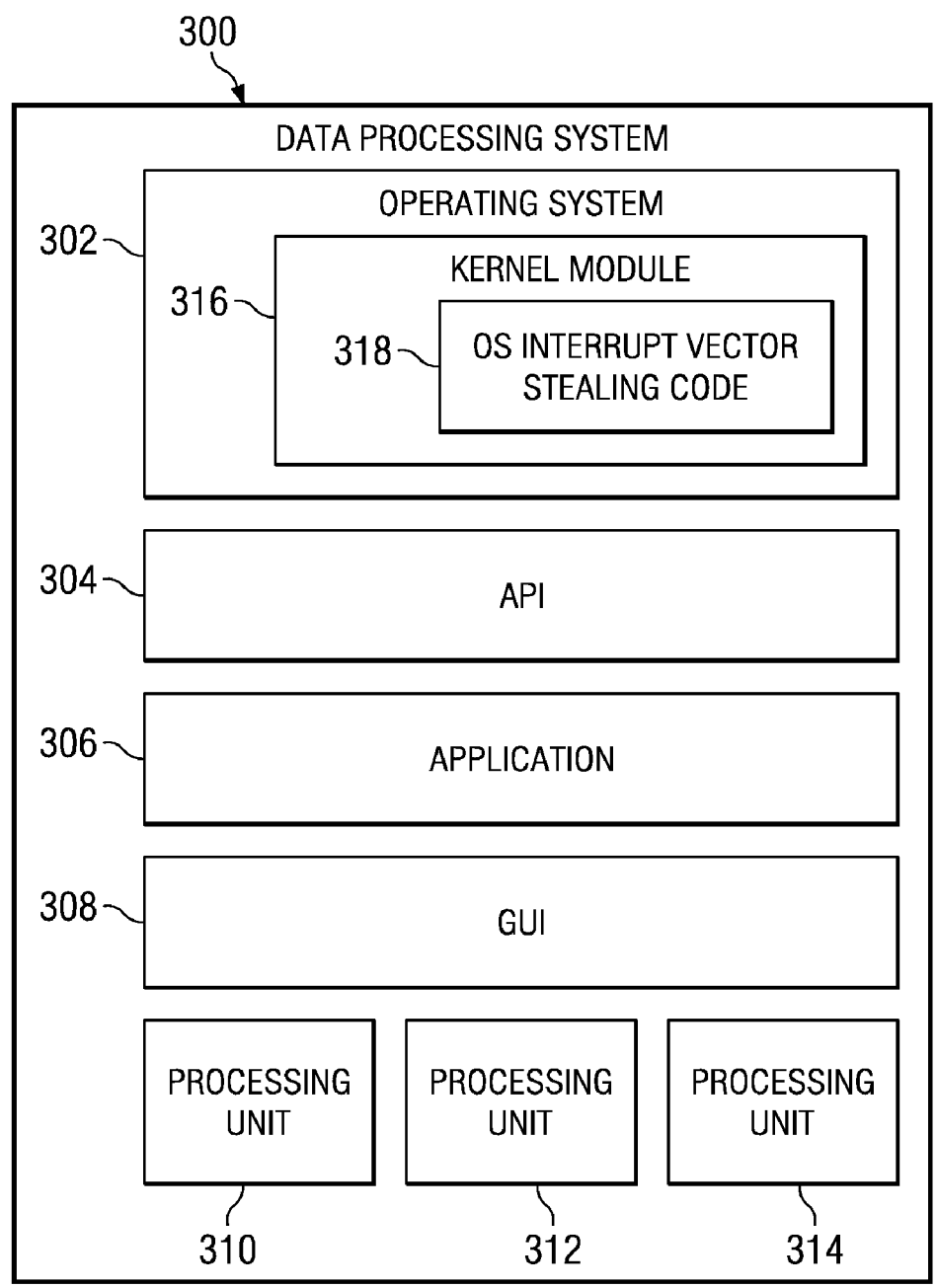
FIG. 3 is a block diagram illustrating components of a data processing system in accordance with an illustrative embodiment.

With reference now to FIG. 3, a block diagram illustrating components of a data processing system is depicted in accordance with an illustrative embodiment. Data processing system 300 may, for example, be implemented in data processing system 200 in FIG. 2. However, it should be noted that the example depicted in FIG. 3 is only intended for the purpose of illustration and does not imply any architectural limitations on illustrative embodiments. In other words, illustrative embodiments may include more or fewer components and may include any components necessary to accomplish the task of stealing interrupt vectors from an OS to allow access by a test program to all system resources or any portion thereof.

In the depicted example of FIG. 3, data processing system 300 includes OS 302, application programming interface (API) 304, application 306, and GUI 308. In addition, data processing system 300 also includes processing units 310, 312, and 314, such as, for example, processing unit 206 in FIG. 2.

OS 302 runs on a processor, such as processing unit 310, 312, and/or 314, and provides high-level control of the components within data processing system 300. It should be noted that illustrative embodiments may reside on OS 302. For example, a superuser, such as a system administrator with root access to data processing system 300, may install kernel module 316 on OS 302. Kernel module 316 is a software module that extends the functionality of a kernel thread to perform processes of an illustrative embodiment. Further, kernel module 316 includes OS interrupt vector stealing code 318. OS interrupt vector stealing code 318 is code for stealing OS interrupt vectors in accordance with processes of illustrative embodiments. Kernel module 316 utilizes OS interrupt vector stealing code 318 to steal OS interrupt handlers at the interrupt vectors from OS 302 to allow a test program access to any and/or all data processing system 300 resources.

After the superuser installs kernel module 316 on OS 302, OS interrupt vector stealing code 318 uses its knowledge of OS 302 and the architecture of data processing system 300 to perform the following steps. First, OS interrupt vector stealing code 318 allocates a contiguous block of real memory that is large enough to contain all existing OS interrupt handlers and custom interrupt handler extension code. After allocating the real memory block, OS interrupt vector stealing code 318 copies the custom interrupt handler extension code into this allocated memory block with space after each custom interrupt handler extension to put the stolen OS interrupt handler for that particular interrupt.

Subsequently, OS interrupt vector stealing code 318 calls a kernel thread for every processing unit in the data processing system, such as processing units 310, 312, and 314. Then, OS interrupt vector stealing code 318 has each kernel thread for processing units 310, 312, and 314 execute a synchronize processing units routine. Consequently, all the kernel threads sync up and disable external interrupts.

Afterward, OS interrupt vector stealing code 318 directs one of the kernel threads, such as a master processing unit kernel thread, to copy each OS interrupt handler from its respective interrupt vector into the allocated memory block behind the OS interrupt handler's associated custom interrupt handler extension code. Subsequently, OS interrupt vector stealing code 318 uses that master processing unit kernel thread to copy the custom interrupt handlers over the OS interrupt handlers in the interrupt handler memory locations. Then, the copying kernel thread signals copying task completion to the other kernel threads. After the copying task is completed, OS interrupt vector stealing code 318 once again syncs up all the kernel threads and re-enables the external interrupts. Then, all but the starting kernel thread terminate.

At this point, the custom interrupt handlers are in place in the interrupt vector memory locations and the custom interrupt handler extension code for each interrupt is positioned directly before the OS interrupt handler code in the contiguous block of real memory. The custom interrupt handler extension code is positioned before the OS interrupt handler code in such a way that if an interrupt is passed on to OS 302, then the custom interrupt handler extension code restores all previously used registers and, without any branch or use of a short relative branch, begins executing the OS interrupt handler code as if the custom interrupt handler code and custom interrupt handler extension code never existed.

API 304 allows a user of data processing system 300, which may be an individual or a software routine, to invoke system capabilities using a standard consistent interface without concern for how the particular functionality is implemented. Application 306 may, for example, be a test program for testing hardware and/or software components of data processing system 300. However, it should be noted that application 306 may represent any type of software application or program and may also represent a plurality of applications and/or programs.

A user of data processing system 300 utilizes GUI 308 to interact with programs and applications residing within data processing system 300, such as, for example, OS 302 and application 306. GUI 308 is a graphics-based user interface that incorporates movable windows and icons, which may be displayed in a display screen and manipulated by user input devices. For example, GUI 308 may be displayed in video display terminal 104 and manipulated by keyboard 106 and mouse 110 in FIG. 1. Typically, GUI 308 is the standard way a user interacts with a computer, such as data processing system 300.

Figure 4:
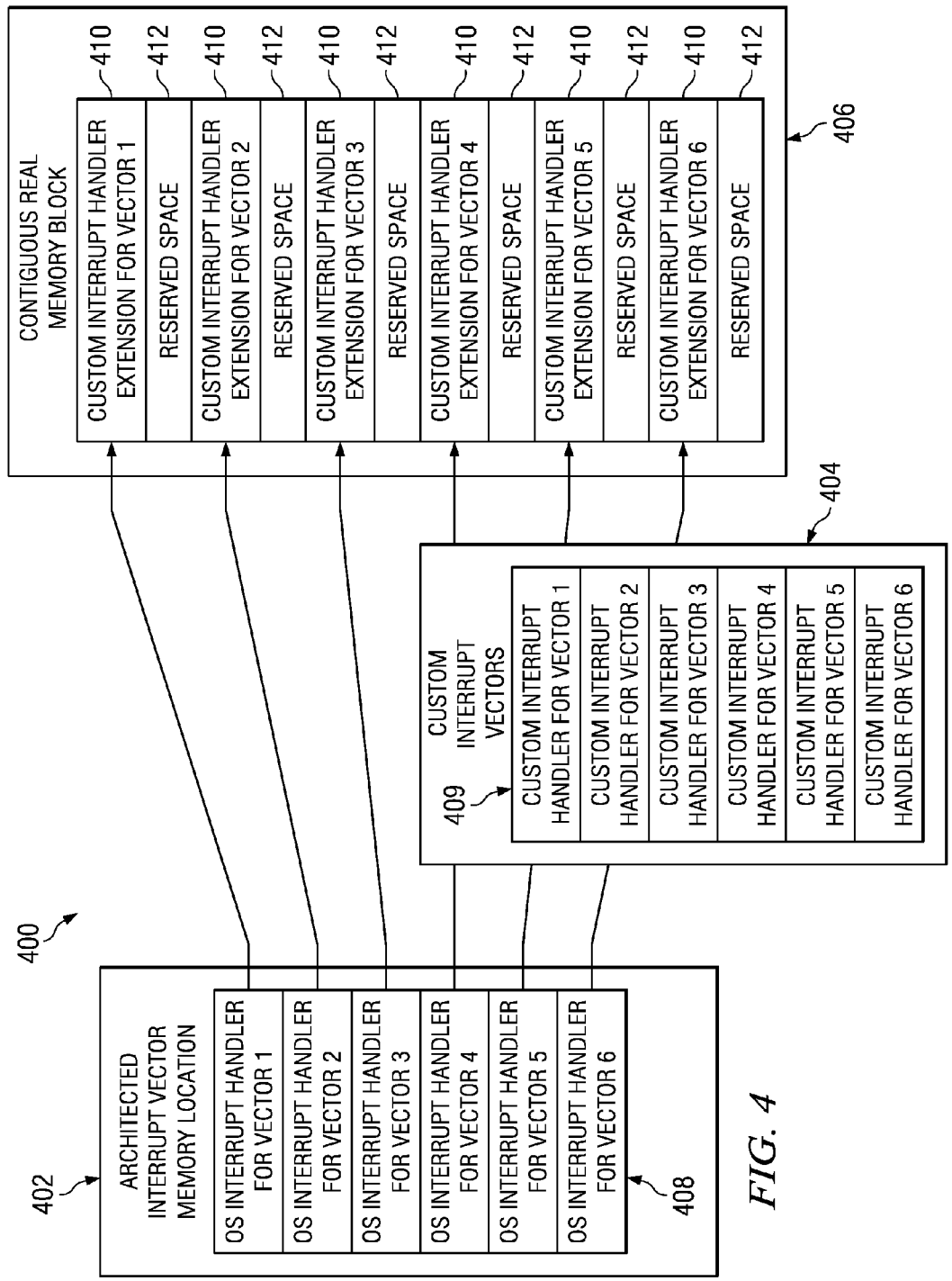
FIG. 4 is an exemplary illustration of copying OS interrupt handlers into a reserved memory space in accordance with an illustrative embodiment.

With reference now to FIG. 4, an exemplary illustration of copying OS interrupt handlers into a reserved memory space is depicted in accordance with an illustrative embodiment. OS interrupt handler copying process 400 includes architected interrupt vector memory location 402, custom interrupt vectors 404, and contiguous real memory block 406. Architected interrupt vector memory location 402 includes OS interrupt handlers 408 for interrupt vectors one through six. Interrupt vectors one through six contain OS interrupt handlers 408 one through six, respectively. Also, custom interrupt vectors 404 include custom interrupt handlers 409 for interrupt vectors one through six. Custom interrupt vectors 404 one through six contain custom interrupt handlers 409 one through six, respectively.

Contiguous real memory block 406 is a contiguous block of real memory that is large enough to store all custom interrupt handler extensions and OS interrupt handlers. In addition, contiguous real memory block 406 is contained within a volatile memory device, such as, for example, main memory 208 in FIG. 2 or another random access memory (RAM) device. Contiguous real memory block 406 includes custom interrupt handler extensions 410 for interrupt vectors one through six and reserved space 412. Interrupt vectors one through six contain custom interrupt handler extensions 410 one through six, respectively. Reserved space 412 is a space reserved for OS interrupt handlers 408 one through six. OS interrupt handlers 408 one through six are associated with custom interrupt handler extensions 410 one through six, respectively. Illustrative embodiments copy each OS interrupt handler 408 one through six below its associated custom interrupt handler extension 410 one through six in reserved space 412.

Figure 5:
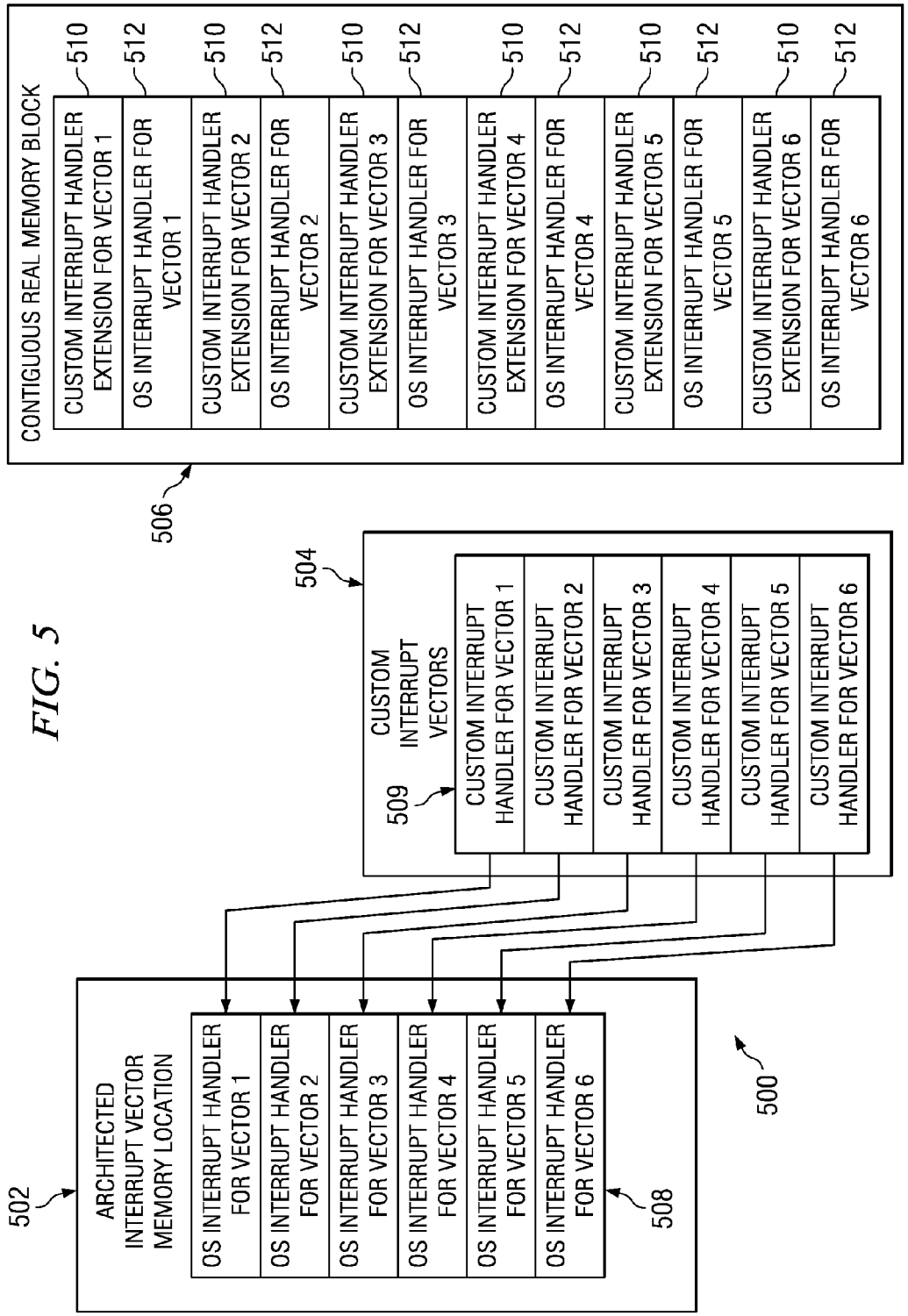
FIG. 5 is an exemplary illustration of copying custom interrupt handlers over OS interrupt handlers in accordance with an illustrative embodiment.

With reference now to FIG. 5, an exemplary illustration of copying custom interrupt handlers over OS interrupt handlers is depicted in accordance with an illustrative embodiment. Custom interrupt handler copying process 500 includes architected interrupt vector memory location 502, custom interrupt vectors 504, and contiguous real memory block 506. Architected interrupt vector memory location 502 includes OS interrupt handlers 508 for vectors one through six. Interrupt vectors one through six contain OS interrupt handlers 508 one through six, respectively.

Custom interrupt vectors 504 include custom interrupt handlers 509 for custom interrupt vectors one through six. Custom interrupt vectors 504 one through six contain custom interrupt handlers 509 one through six, respectively. Custom interrupt handlers 509 one through six are associated with OS interrupt handlers 508 one through six, respectively. Illustrative embodiments copy custom interrupt handlers 509 one through six over OS interrupt handlers 508 one through six, respectively, in architected interrupt vector memory location 502.

After illustrative embodiments copied OS interrupt handlers 408 for vectors one through six after their associated custom interrupt handler extensions 410 for vectors one through six in reserved space 412 in FIG. 4, contiguous real memory block 506 contains custom interrupt handler extensions 510 for vectors one through six and OS interrupt handlers 512 for vectors one through six. OS interrupt handlers 512 for vectors one through six are duplicate copies of OS interrupt handlers 508 for vectors one through six, respectively.

Figure 6:
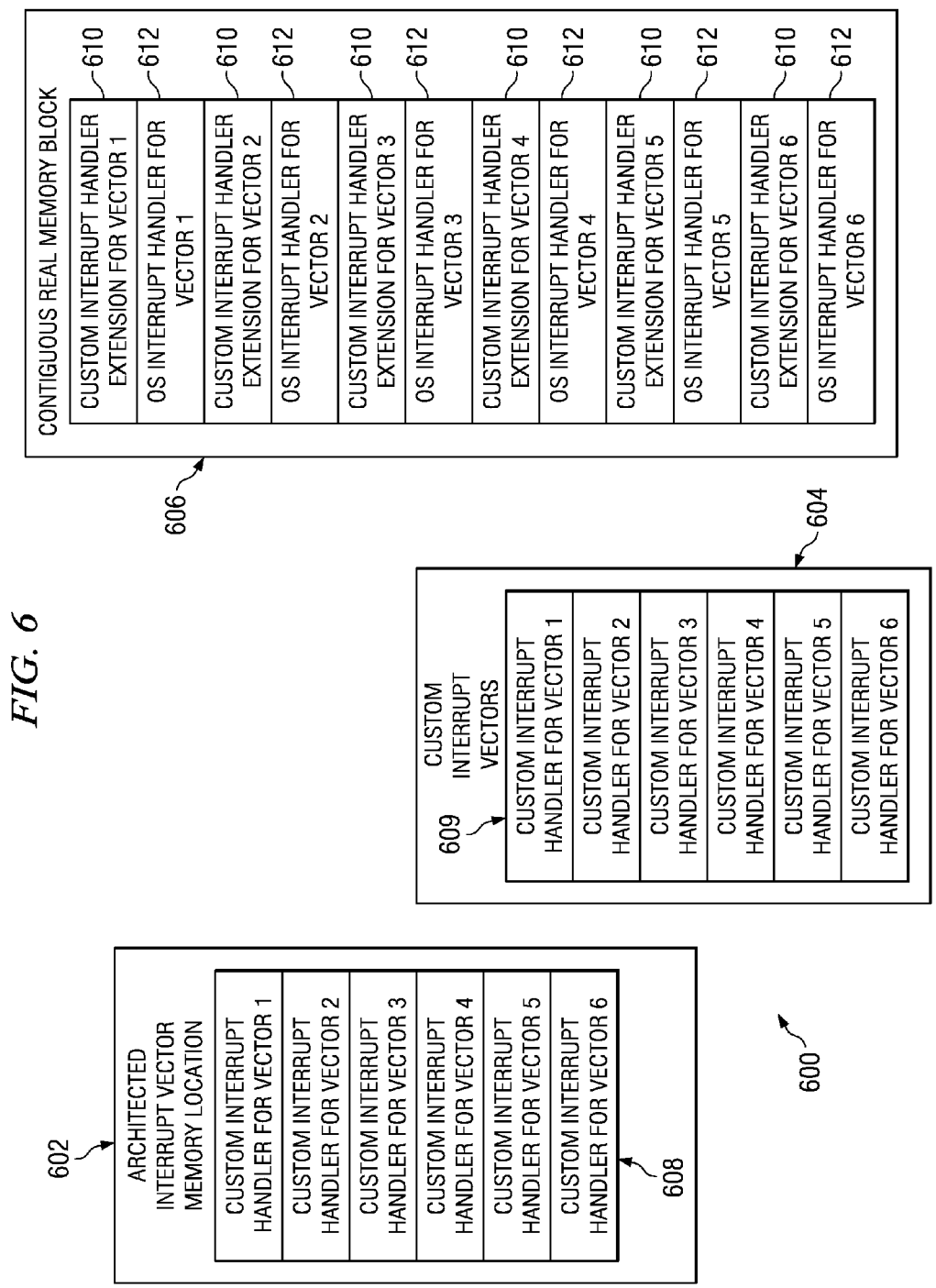
FIG. 6 is an exemplary illustration of a final memory map after stealing interrupt vectors from an OS in accordance with an illustrative embodiment.

With reference now to FIG. 6, an exemplary illustration of a final memory map after stealing interrupt vectors from an OS is depicted in accordance with an illustrative embodiment. Final memory map 600 includes architected interrupt vector memory location 602, custom interrupt vectors 604, and contiguous real memory block 606.

Subsequent to illustrative embodiments copying custom interrupt handlers 509 for vectors one through six over OS interrupt handlers 508 for vectors one through six in FIG. 5, architected interrupt vector memory location 602 contains custom interrupt handlers 608 for vectors one through six instead of OS interrupt handlers for vectors one through six, such as, for example, OS interrupt handlers 508 for vectors one through six in architected interrupt vector memory location 502 in FIG. 5. Custom interrupt handlers 608 for vectors one through six are duplicate copies of custom interrupt handlers 609 for vectors one through six, respectively. Contiguous real memory block 606 contains custom interrupt handler extensions 610 for vectors one through six and OS interrupt handlers 612 for vectors one through six, such as, for example contiguous real memory block 506 in FIG. 5.

It should be noted that custom interrupt handlers 608 handle all interrupts. Then, custom interrupt handlers 608 branch to the associated custom interrupt handler extensions 610 where custom handling continues, if necessary. Alternatively, the interrupt state is restored and OS interrupt handlers 612 handle the interrupt as normal.

Figure 7:
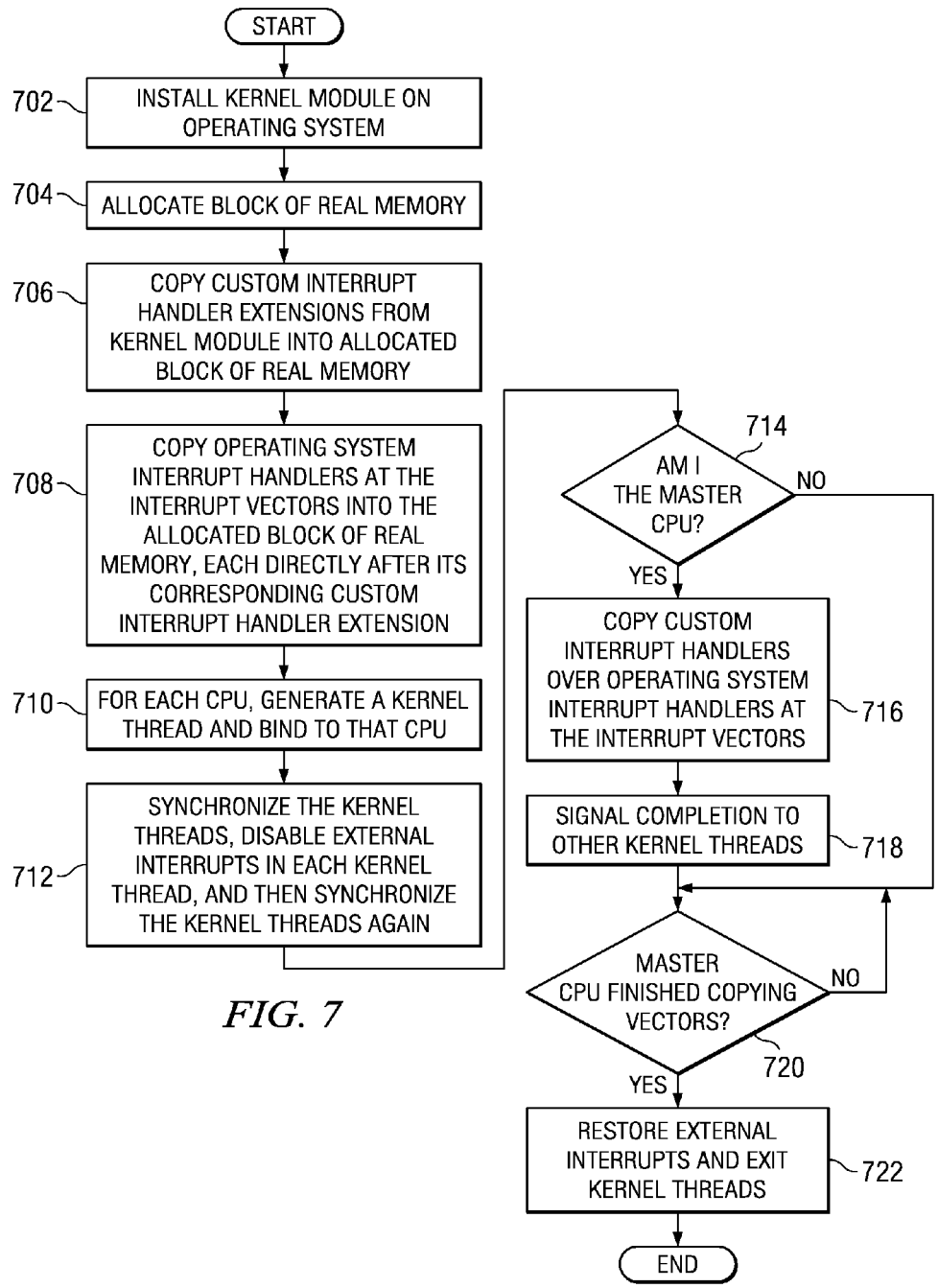
FIG. 7 is a flowchart illustrating an exemplary process for stealing interrupt vectors from an OS in accordance with an illustrative embodiment.

With reference now to FIG. 7, a flowchart illustrating an exemplary process for stealing interrupt vectors from an OS is shown in accordance with an illustrative embodiment. The process shown in FIG. 7 may be implemented in a kernel module, such as, for example, kernel module 316 in FIG. 3.

The process begins when a superuser, such as a system administrator with root access to the system, installs the kernel module on an OS, such as OS 302 in FIG. 3 (step 702). After the superuser installs the kernel module in step 702, the kernel module allocates a block of real memory, such as, for example, contiguous real memory block 406 in FIG. 4 (step 704). Subsequently, the kernel module copies custom interrupt handler extensions for interrupt vectors, such as, for example, custom interrupt handler extensions 410 for vectors one through six in FIG. 4, into the allocated block of real memory (step 706).

Then, the kernel module copies OS interrupt handlers for interrupt vectors, such as, for example, OS interrupt handlers 408 for vectors one through six in FIG. 4, into the allocated block of real memory, each directly after its corresponding custom interrupt handler extension in a reserved space, such as, for example, reserved space 412 in FIG. 4 (step 708). However, it should be noted that in an alternative embodiment, step 708 may not need to be performed if the kernel module is loaded into real memory. The kernel module may be loaded into real memory by, for example, performing a "hack" to the operating system kernel. Afterward, the kernel module generates a kernel thread for each central processing unit, such as, for example, processing units 310, 312, and 314 in FIG. 3, in the system and binds the generated kernel thread to its associated central processing unit (step 710). Subsequently, the kernel module synchronizes the kernel threads, disables external interrupts in each kernel thread, and then synchronizes the kernel threads again (step 712).

Afterward, each of the central processing units in the system makes a determination as to whether the central processing unit is a master central processing unit (step 714). If the central processing unit is the master central processing unit, yes output of step 714, then the kernel module uses the created kernel thread in the master central processing unit to copy custom interrupt handlers for interrupt vectors, such as, for example, custom interrupt handlers 509 for vectors one through six in FIG. 5, over the OS interrupt handlers in an architected interrupt vector memory location, such as, for example, architected interrupt vector memory location 502 in FIG. 5 (step 716). Subsequently, the created kernel thread in the master central processing unit signals to the other created kernel threads in their respective central processing units that copying of custom interrupt handlers over OS interrupt handlers for the interrupt vectors is completed (step 718). Thereafter, the process proceeds to step 720.

Returning again to step 714, if the central processing unit is not the master central processing unit, no output of step 714, then the central processing unit makes a determination as to whether the master central processing unit is finished copying interrupt handlers for the interrupt vectors (step 720). If the master central processing unit is not finished copying interrupt handlers for the interrupt vectors, no output of step 720, then the process returns to step 720 where the central processing unit waits for the master central processing unit to finish the copying process. If the master central processing unit is finished copying interrupt handlers for the interrupt vectors, yes output of step 720, then the kernel module restores external interrupts in each kernel thread and exits the kernel threads (step 722). The process terminates thereafter.

Figure 8:
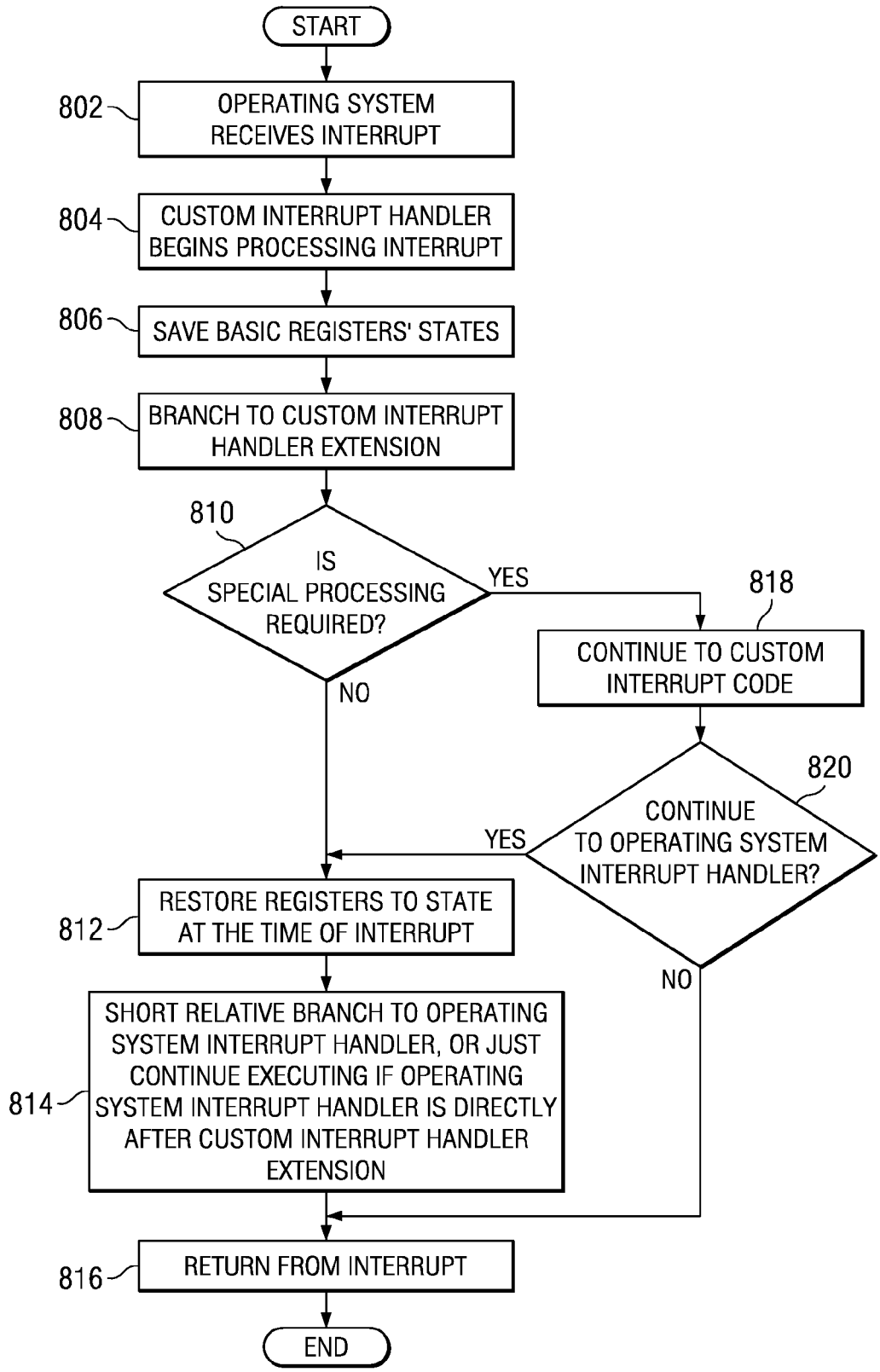
FIG. 8 is a flowchart illustrating an exemplary process for processing OS interrupts in accordance with an illustrative embodiment.

With reference now to FIG. 8, a flowchart illustrating an exemplary process for processing OS interrupts is shown in accordance with an illustrative embodiment. The process shown in FIG. 8 may be implemented in a custom interrupt handler at a vector, such as, for example, custom interrupt handler 608 in FIG. 6 for vector 1.

The process begins when an OS, such as, for example, OS 302 in FIG. 3, receives an interrupt (step 802). Subsequent to the OS receiving the interrupt, the custom interrupt handler at the vector begins processing the interrupt (step 804). Afterward, the custom interrupt handler at the vector saves basic registers' states (step 806). Then, the custom interrupt handler at the vector branches to a custom interrupt handler extension at a vector, such as, for example, custom interrupt handler extension 610 at vector 1 in FIG. 6, associated with the interrupt (step 808).

After branching to the custom interrupt handler extension, the custom interrupt handler extension makes a determination as to whether special processing, such as, for example, system resource testing, is required by the custom interrupt handler extension (step 810). If special processing is not required, no output of step 810, then the custom interrupt handler extension restores the basic registers to their states at the time of the interrupt (step 812). Then, the custom interrupt handler extension short relative branches to an OS interrupt handler at a vector, such as, for example, OS interrupt handler 612 at vector 1 in FIG. 6, or just continues executing as if the OS interrupt handler is directly after the custom interrupt handler extension (step 814). Subsequently, the custom interrupt handler extension returns from the interrupt (step 816). The process terminates thereafter.

Returning again to step 810, if special processing is required, yes output of step 810, then the custom interrupt handler extension continues to custom interrupt code (step 818). After returning to the custom interrupt handler extension upon completion of the custom interrupt code in step 818, the custom interrupt handler extension makes a determination as to whether the custom interrupt handler extension continues to the OS interrupt handler (step 820). If the custom interrupt handler extension does continue to the OS interrupt handler, yes output of step 820, then the process returns to step 812 where the custom interrupt handler extension restores the basic registers to their states at the time of the interrupt. If the custom interrupt handler extension does not continue to the OS interrupt handler, no output of step 820, then the process returns to step 816 where the custom interrupt handler extension returns from the interrupt.

Thus, illustrative embodiments provide a computer implemented method, system, and computer usable program code for stealing interrupt vectors from an OS to allow a test program access to all system resources. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable storage medium providing program code for use by or in connection with a computer or any instruction execution system. For the purposes of this description, a computer-usable or computer-readable storage medium may be any tangible apparatus that may contain or store the program for use by or in connection with the instruction execution system, apparatus, or device.

The medium may be an electronic, magnetic, optical, or semiconductor system (or apparatus or device). Examples of a computer-readable storage medium include a semiconductor or solid-state memory, magnetic tape, a removable computer diskette, a random access memory (RAM), a ROM, a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, et cetera) may be coupled to the system either directly or through intervening I/O controllers.

Network adapters also may be coupled to the system to enable the data processing system to become coupled to other data processing systems, remote printers, or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for stealing interrupt vectors from an operating system, the computer implemented method comprising:
    copying, by a kernel module, a plurality of custom interrupt handler extensions from the kernel module into an allocated block of memory;
    copying, by the kernel module, a plurality of operating system interrupt handlers from an interrupt vector memory location into a plurality of reserved spaces in the allocated block of memory, each of the plurality of reserved spaces is located directly after each of the plurality of custom interrupt handler extensions within the allocated block of memory so that each of the copied plurality of operating system interrupt handlers is contiguous to its corresponding custom interrupt handler extension;
    responsive to copying the plurality of operating system interrupt handlers into the plurality of reserved spaces in the allocated block of memory, copying, by the kernel module, a plurality of custom interrupt handlers from the kernel module over the plurality of operating system interrupt handlers in the interrupt vector memory location, wherein the plurality of custom interrupt handlers after being copied into the interrupt vector memory location handle interrupts received by the operating system;
    generating a kernel thread for each of one or more processing units to form a generated kernel thread for each of the one or more processing units;
    disabling, by the kernel module, external interrupts in each generated kernel thread;
    determining, by the kernel module, if a master processing unit is finished copying the plurality of custom interrupt handlers over the plurality of operating system interrupt handlers; and
    responsive to determining that the master processing unit is finished copying the plurality of custom interrupt handlers over the plurality of operating system interrupt handlers, restoring, by the kernel module, the external interrupts.

2. The computer implemented method of claim 1, further comprising:
    responsive to the operating system receiving an interrupt, branching to one of the plurality of custom interrupt handler extensions from one of the plurality of custom interrupt handlers that is associated with the interrupt, wherein the one of the plurality of custom interrupt handler extensions corresponds with the one of the plurality of custom interrupt handlers;
    determining if special processing is required by the one of the plurality of custom interrupt handler extensions;
    responsive to determining that special processing is required by the one of the plurality of custom interrupt handler extensions, continuing to custom interrupt code; and
    returning from the interrupt.

3. The computer implemented method of claim 2, further comprising:
    responsive to determining that special processing is not required by the one of the plurality of custom interrupt handler extensions, restoring registers to a state at a time of the interrupt, wherein the registers are in the one or more processing units.

4. The computer implemented method of claim 3, wherein the generated kernel thread of a master processing unit copies the plurality of custom interrupt handlers over the plurality of operating system interrupt handlers in the interrupt vector memory location.

5. The computer implemented method of claim 2, wherein the custom interrupt code executes a plurality of test programs at a same time to test system resources, and wherein the custom interrupt code includes hooks to access a lowest level of system resources.

6. The computer implemented method of claim 2, wherein the branching, determining if special processing is required, continuing, and returning steps are performed by a custom interrupt handler.

7. The computer implemented method of claim 1, wherein the allocated block of memory is large enough to store the plurality of custom interrupt handler extensions and the plurality of operating system interrupt handlers.

8. The computer implemented method of claim 1, wherein the allocated block of memory is contained within a real memory device, and wherein the real memory device is a volatile memory device.

9. The computer implemented method of claim 1, wherein the allocated block of memory is a contiguous block of memory.

10. The computer implemented method of claim 1, wherein each of the plurality of operating system interrupt handlers are associated with a different custom interrupt handler extension.

11. The computer implemented method of claim 1, wherein a superuser installs the kernel module on the operating system.

12. The computer implemented method of claim 1, wherein the operating system is an advanced interactive executive operating system.

13. A data processing system for stealing interrupt vectors from an operating system, comprising:
  a bus system;
  a storage device connected to the bus system, wherein the storage device includes a set of instructions;
  one or more processing units connected to the bus system, wherein at least one of the processing units executes the set of instructions to copy, by a kernel module, a plurality of custom interrupt handler extensions from the kernel module into an allocated block of memory; copy, by the kernel module, a plurality of operating system interrupt handlers from an interrupt vector memory location into a plurality of reserved spaces in the allocated block of memory, each of the plurality of reserved spaces is located directly after each of the plurality of custom interrupt handler extensions within the allocated block of memory so that each of the copied plurality of operating system interrupt handlers is contiguous to its corresponding custom interrupt handler extension; and copy, by the kernel module, a plurality of custom interrupt handlers from the kernel module over the plurality of operating system interrupt handlers in the interrupt vector memory location in response to copying the plurality of operating system interrupt handlers into the plurality of reserved spaces in the allocated block of memory, wherein the plurality of custom interrupt handlers after being copied into the interrupt vector memory location handle interrupts received by the operating system;
  a master processing unit;
  wherein the at least one of the processing units executes the set of instructions to generate a kernel thread for each of the one or more processing units to form a generated kernel thread for each of the one or more processing units; disable, by the kernel module, external interrupts in each generated kernel thread; determine, by the kernel module, if the master processing unit is finished copying the plurality of custom interrupt handlers over the plurality of operating system interrupt handlers; and responsive to determining that the master processing unit is finished copying the plurality of custom interrupt handlers over the plurality of operating system interrupt handlers, restore, by the kernel module, the external interrupts.

14. A computer program product stored on a computer readable storage medium having computer usable program code embodied thereon that is executable by a computer for stealing interrupt vectors from an operating system, the computer program product comprising:
  computer usable program code configured to copy, by a kernel module, a plurality of custom interrupt handler extensions from the kernel module into an allocated block of memory;
  computer usable program code configured to copy, by the kernel module, a plurality of operating system interrupt handlers from an interrupt vector memory location into a plurality of reserved spaces in the allocated block of memory, each of the plurality of reserved spaces is located directly after each of the plurality of custom interrupt handler extensions within the allocated block of memory so that each of the copied plurality of operating system interrupt handlers is contiguous to its corresponding custom interrupt handler extension;
  computer usable program code configured to copy, by the kernel module, a plurality of custom interrupt handlers from the kernel module over the plurality of operating system interrupt handlers in the interrupt vector memory location in response to copying the plurality of operating system interrupt handlers into the plurality of reserved spaces in the allocated block of memory, wherein the plurality of custom interrupt handlers after being copied into the interrupt vector memory location handle interrupts received by the operating system;
  computer usable program code configured to generate a kernel thread for each of one or more processing units to form a generated kernel thread for each of the one or more processing units;
  computer usable program code configured to disable, by the kernel module, external interrupts in each generated kernel thread;
  computer usable program code configured to determine, by the kernel module, if a master processing unit is finished copying the plurality of custom interrupt handlers over the plurality of operating system interrupt handlers; and
  responsive to determining that the master processing unit is finished copying the plurality of custom interrupt handlers over the plurality of operating system interrupt handlers, computer usable program code configured to restore, by the kernel module, the external interrupts.

15. The computer program product of claim 14, further comprising:
  computer usable program code configured to branch to one of the plurality of custom interrupt handler extensions from one of the plurality of custom interrupt handlers that is associated with the interrupt in response to the operating system receiving the interrupt, wherein the one of the plurality of custom interrupt handler extensions corresponds with the one of the plurality of custom interrupt handlers;
  computer usable program code configured to determine if special processing is required by the one of the plurality of custom interrupt handler extensions;
  computer usable program code configured to continue to custom interrupt code in response to determining that special processing is required by the one of the plurality of custom interrupt handler extensions; and
  computer usable program code configured to return from the interrupt.

16. The computer program product of claim 15, further comprising:
  computer usable program code configured to restore registers to a state at a time of the interrupt in response to determining that special processing is not required by the one of the plurality of custom interrupt handler extensions, wherein the registers are in the one or more processing units.

* * * * *